US010982120B2

(12) United States Patent
Ota et al.

(10) Patent No.: US 10,982,120 B2
(45) Date of Patent: Apr. 20, 2021

(54) THERMOCURABLE ELECTROCONDUCTIVE ADHESIVE

(71) Applicant: THREEBOND CO., LTD., Tokyo (JP)

(72) Inventors: Soichi Ota, Tokyo (JP); Hitoshi Mafune, Tokyo (JP); Makoto Kato, Tokyo (JP); Tomoya Kodama, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 0 days.

(21) Appl. No.: 16/330,517

(22) PCT Filed: Aug. 17, 2017

(86) PCT No.: PCT/JP2017/029567
§ 371 (c)(1),
(2) Date: Mar. 5, 2019

(87) PCT Pub. No.: WO2018/047597
PCT Pub. Date: Mar. 15, 2018

(65) Prior Publication Data
US 2019/0194502 A1 Jun. 27, 2019

(30) Foreign Application Priority Data
Sep. 6, 2016 (JP) .............................. JP2016-173765

(51) Int. Cl.
*H01B 1/22* (2006.01)
*H01B 1/20* (2006.01)
*C09J 9/02* (2006.01)
*C09J 201/00* (2006.01)
*C09J 11/02* (2006.01)
*C09J 163/00* (2006.01)
*C09J 11/04* (2006.01)
*C09J 11/06* (2006.01)
*C09J 163/10* (2006.01)
*C08K 3/08* (2006.01)
*C08K 9/04* (2006.01)
*C08K 5/14* (2006.01)
*C08K 5/00* (2006.01)

(52) U.S. Cl.
CPC ................. *C09J 9/02* (2013.01); *C09J 11/02* (2013.01); *C09J 11/04* (2013.01); *C09J 11/06* (2013.01); *C09J 163/00* (2013.01); *C09J 163/10* (2013.01); *C09J 201/00* (2013.01); *H01B 1/20* (2013.01); *H01B 1/22* (2013.01); *C08K 5/0091* (2013.01); *C08K 5/14* (2013.01); *C08K 9/04* (2013.01); *C08K 2003/0806* (2013.01); *C08K 2201/001* (2013.01)

(58) Field of Classification Search
CPC H01L 31/038; H01L 31/022425; C09J 11/04; C09J 9/02; B22F 1/00; C08G 59/40
USPC ........................................................ 136/256
See application file for complete search history.

(56) References Cited

U.S. PATENT DOCUMENTS

| 6,404,068 B1* | 6/2002 | Tanaka .................. H01L 23/293 257/787 |
| 2010/0112323 A1* | 5/2010 | Mori ....................... B32B 27/08 428/220 |
| 2013/0289166 A1* | 10/2013 | Makihara ................ C08L 13/00 523/438 |
| 2014/0216544 A1* | 8/2014 | Nakahara .............. H01L 31/048 136/256 |
| 2015/0353779 A1* | 12/2015 | Mu .................. H01L 31/022425 136/256 |
| 2016/0194531 A1 | 7/2016 | Aoki et al. |

FOREIGN PATENT DOCUMENTS

| JP | 2000-133043 A | | 5/2000 | |
| JP | 2008-288601 A | | 11/2008 | |
| JP | 2009-070724 A | | 4/2009 | |
| JP | 2010-174311 | * | 8/2010 | ................ B22F 1/00 |
| JP | 2012-046757 A | | 3/2012 | |
| JP | 2013-253151 | * | 12/2013 | .............. C09J 11/04 |
| JP | 2013-253151 A | | 12/2013 | |
| JP | 2015-054942 A | | 3/2015 | |
| JP | 2016-048807 A | | 4/2016 | |
| JP | 2016-060761 A | | 4/2016 | |
| WO | 2016/125644 A1 | | 8/2016 | |

OTHER PUBLICATIONS

International Search Report with English translation and Written Opinion dated Nov. 7, 2017 in corresponding International Application No. PCT/JP2017/029567; 14 pages.
Office Action dated Mar. 20, 2020, in corresponding Chinese Application No. 201780054471.2, 10 pages.
Chinese Office Action dated Aug. 25, 2020, in connection with corresponding CN Application No. 201780054471.2 (10 pp., including machine-generated English translation).
Chinese Office Action dated Nov. 11, 2020, in connection with corresponding CN Application No. 201780054471.2 (10 pp., including machine-generated English translation).

* cited by examiner

*Primary Examiner* — Khanh T Nguyen
(74) *Attorney, Agent, or Firm* — Maier & Maier, PLLC

(57) ABSTRACT

Conventionally, when an adherend is nickel or the like, it has been difficult to realize an electroconductive adhesive that lowers connection resistance in various kinds of thermocurable curing resins. However, it is possible to provide an electroconductive adhesive, in the case where the adherend is nickel or the like, which reduces connection resistance in various kinds of thermocurable curing resins while simultaneously maintaining storage stability to have good handleability. The present description provides a thermocurable electroconductive adhesive including the following components (A) to (D): Component (A): a curable resin, Component (B): a thermal curing agent that cures Component (A), Component (C): an organometallic complex, and Component (D): electroconductive particles.

21 Claims, No Drawings

THERMOCURABLE ELECTROCONDUCTIVE ADHESIVE

FIELD

The present invention relates to a thermocurable electroconductive adhesive having a low connection resistance value.

BACKGROUND

Conventionally, it is known that an electroconductive paste including copper powder added thereto is added with a reducing agent, but the purpose of adding the reducing agent is to prevent oxidation of copper powder and suppress deterioration of conductivity. Meanwhile, the invention described in JP 2009-70724 A is an electroconductive paste using copper powder including a metal complex and a reducing agent. In the present invention, conductivity is improved by reducing the metal complex to generate fine metal particles. However, only the conductivity of a coating film itself of the electroconductive paste is improved, and an influence on an adherend such as an electrode, is not considered.

An electroconductive adhesive is a material for connecting two adherends. Therefore, circuit resistance is composed of a resistance value of the adherend, a connection resistance value at an interface between the adherend and the electroconductive adhesive, and a resistance value of the electroconductive adhesive. It is known that as the circuit resistance value is lower, the connection resistance value affects the circuit resistance. In particular, passivation is formed on a surface of a metal such as nickel, and the connection resistance value tends to be high. In order to reduce the connection resistance value, the invention of JP 2000-133043 A has been found. However, as electroconductive particles, nickel powder is included as an essential component, and thus a resistance value of the electroconductive adhesive tends to increase.

SUMMARY

Conventionally, when an adherend is nickel or the like, it has been difficult to realize an electroconductive adhesive that lowers connection resistance by using various kinds of thermocurable curing resins.

As a result of intensive studies to achieve the above object, the present inventors found a technique relating to a thermocurable electroconductive adhesive and completed the present invention.

The gist of the present invention is described below. A first embodiment of the present invention is a thermocurable electroconductive adhesive including the following components (A) to (D).

Component (A): a curable resin,
Component (B): a thermal curing agent that cures Component (A),
Component (C): an organometallic complex, and
Component (D): electroconductive particles.

A second embodiment of the present invention is the thermocurable electroconductive adhesive according to the first embodiment, wherein the component (A) is a compound having a (meth)acrylic group, and the component (B) is an organic peroxide having the following structure of General Formula 1 to be described below.

A third embodiment of the present invention is the thermocurable electroconductive adhesive according to the first or second embodiment, wherein the component (B) is an organic peroxide having the following structure of General Formula 2 to be described below.

A fourth embodiment of the present invention is the thermocurable electroconductive adhesive according to any one of the first to third embodiments, wherein when the component (A) is the compound having the (meth) acrylic group, the organic peroxide which is the component (B) is included in an amount of 1 to 10 parts by mass with respect to 100 parts by mass of the total of the component (A).

A fifth embodiment of the present invention is the thermocurable electroconductive adhesive according to any one of the first to fourth embodiments, wherein the component (C) is included in an amount of 0.1 to 10 parts by mass with respect to 100 parts by mass of the component (B).

A sixth embodiment of the present invention is the thermocurable electroconductive adhesive according to any one of the first to fifth embodiments, wherein the component (A) is a compound having a cyclic ether group, and the component (B) is a latent curing agent that cures the component (A).

A seventh embodiment of the present invention is the thermocurable electroconductive adhesive according to any one of the first to sixth embodiments, wherein the component (A) is a compound having at least one group selected from the group consisting of an epoxy group, an alicyclic epoxy group, and an oxetane group, and the component (B) is an amine compound or a cation catalyst.

An eighth embodiment of the present invention is the thermocurable electroconductive adhesive according to the sixth or seventh embodiment, wherein when the component (A) is the compound having the cyclic ether group, the latent curing agent which is the component (B) is included in an amount of 1 to 30 parts by mass with respect to 100 parts by mass of the component (A).

A ninth embodiment of the present invention is the thermocurable electroconductive adhesive according to any one of the first to eighth embodiments, wherein a metal of the component (C) is a divalent metal or a trivalent metal.

A tenth embodiment of the present invention is the thermocurable electroconductive adhesive according to any one of the first to ninth embodiments, wherein the component (C) is an organometallic complex including a ligand having an alkoxy group and/or a carboxylate group.

An eleventh embodiment of the present invention is the thermocurable electroconductive adhesive according to any one of the first to tenth embodiments, wherein the metal of the component (C) is at least one kind selected from the group consisting of zinc, aluminum, iron, cobalt, nickel, tin and copper.

A twelfth embodiment of the present invention is the thermocurable electroconductive adhesive according to any one of the first to eleventh embodiments, wherein the component (D) is at least one kind selected from silver powder surface-treated with stearic acid and silver plating powder surface-treated with stearic acid.

A thirteenth embodiment of the present invention is the thermocurable electroconductive adhesive according to any one of the first to twelfth embodiments, wherein the component (D) is included in an amount of 100 to 1000 parts by mass with respect to 100 parts by mass of the component (A).

A fourteenth embodiment of the present invention is the thermocurable electroconductive adhesive according to any one of the first to thirteenth embodiments, wherein a reducing agent is not included.

A fifteenth embodiment of the present invention is the thermocurable electroconductive adhesive according to any one of the first to fourteenth embodiments, wherein the thermocurable electroconductive adhesive is used for an adherend of which an outermost surface is nickel.

DETAILED DESCRIPTION

A thermocurable electroconductive adhesive of the present invention includes: Component (A): a curable resin, Component (B): a thermal curing agent that cures Component (A), Component (C): an organometallic complex, and Component (D): electroconductive particles. According to this configuration, it is possible to provide a thermocurable electroconductive adhesive, in the case where the adherend is nickel or the like, which reduces connection resistance in various kinds of thermocurable curing resins while simultaneously maintaining storage stability to have good handleability.

Details of the thermocurable electroconductive adhesive (also simply referred to as a composition) of the present invention are described below. The component (A) that is usable in the present invention is a curable resin, and the composition to which the thermal curing agent of the component (B) to be described below is added is cured by heating. The curable resin may be a compound having a (meth) acrylic group, and examples thereof may include a urethane modified oligomer having a (meth)acrylic group, a monomer having one (meth) acrylic group, and a monomer having two (meth)acrylic groups, a monomer having three (meth) acrylic groups, a (meth) acrylamide monomer, and the like, but the curable resin is not limited thereto. In addition, the curable resin may be a compound such as a compound having a cyclic ether group such as an epoxy group, an alicyclic epoxy group, and an oxetane group. In the thermocurable electroconductive adhesive of the present invention, even in a case where the adherend is nickel or the like, the connection resistance can be lowered and the storage stability is excellent in various types of thermocurable curing resins such as the compound having the (meth) acrylic group or the compound having the cyclic ether group, as the component (A).

Examples of the compound having a (meth)acrylic group may include a modified oligomer such as a urethane-modified oligomer having a (meth)acrylic group or an epoxy-modified oligomer having a (meth)acrylic group, a monomer having one or more (meth)acrylic groups in a molecule, and the like, but the present invention is not limited thereto.

As the urethane-modified oligomer having a (meth) acrylic group, a compound having a hydroxyl group and a (meth) acrylic group in an unreacted isocyanate group obtained by forming a urethane bond with polyol and polyisocyanate, and a compound obtained by synthesis such as adding an acrylic acid, have been known. Specific examples of the urethane-modified oligomer having a (meth) acrylic group may include AH-600, AT-600, UA-306H, UF-8001G manufactured by KYOEISHA CHEMICAL Co., LTD., Ebecryl 220 as Ebecryl series manufactured by DAICEL-ALLNEX LTD., and the like, but the urethane-modified oligomer having a (meth) acrylic group is not limited thereto.

Examples of the monomer having one (meth)acrylic group may include (meth) acrylate, 2-hydroxypropyl (meth) acrylate, 2-hydroxyethyl (meth) acrylate, 4-hydroxybutyl (meth) acrylate, 2-(meth)acryloyloxyethyl succinic acid, lauryl (meth)acrylate, stearyl (meth)acrylate, ethyl carbitol (meth) acrylate, tetrahydrofurfuryl (meth) acrylate, capro- lactone-modified tetrahydrofurfuryl (meth) acrylate, cyclohexyl (meth) acrylate, dicyclopentanyl (meth) acrylate, isobornyl (meth)acrylate, benzyl (meth)acrylate, phenyl (meth) acrylate, phenoxyethyl (meth) acrylate, phenoxy diethylene glycol (meth)acrylate, phenoxy tetraethylene glycol (meth) acrylate, nonylphenoxyethyl (meth) acrylate, nonylphenoxy tetraethylene glycol (meth)acrylate, methoxy diethylene glycol (meth)acrylate, ethoxy diethylene glycol (meth) acrylate, butoxyethyl (meth) acrylate, butoxy triethylene glycol (meth) acrylate, 2-ethylhexyl polyethylene glycol (meth) acrylate, nonylphenyl polypropylene glycol (meth) acrylate, methoxydipropylene glycol (meth) acrylate, glycidyl (meth) acrylate, polyethylene glycol (meth) acrylate, polypropylene glycol (meth) acrylate, epichlorohydrin-modified butyl (meth) acrylate, epichlorohydrin-modified phenoxy (meth) acrylate, ethylene oxide-modified phthalic acid (meth) acrylate, ethylene oxide-modified succinic acid (meth) acrylate, caprolactone-modified 2-hydroxyethyl (meth) acrylate, N, N-dimethylaminoethyl (meth) acrylate, N, N-diethylaminoethyl (meth) acrylate, 2-hydroxyethyl (meth) acrylate acid phosphate, and the like, but the monomer having one (meth) acrylic group is not limited thereto. A monomer having two or more (meth) acrylic groups in a molecule can be added to the extent that the properties of the present invention are not impaired. However, in consideration of the expression of conductivity, it is preferable not to add a monomer having two or more (meth) acrylic groups in the molecule.

Examples of the monomer having two (meth) acrylic groups may include 1,3-butylene glycol di(meth) acrylate, 1,4-butylene glycol di(meth) acrylate, tricyclodecanedimethanol di(meth) acrylate, neopentyl glycol di(meth) acrylate, 1,6-hexaneglycol di(meth) acrylate, ethylene glycol diacrylate, tetraethylene glycol di(meth) acrylate, polyethylene glycol di(meth) acrylate, propylene glycol di(meth) acrylate, tripropylene glycol di(meth) acrylate, ethylene oxide-modified neopentyl glycol di(meth) acrylate, propylene oxide-modified neopentyl glycol di(meth)acrylate, bisphenol A di(meth)acrylate, ethylene oxide-modified bisphenol A di(meth)acrylate, epichlorohydrin-modified bisphenol A di(meth)acrylate, ethylene oxide-modified bisphenol S di(meth)acrylate, neopentyl glycol-modified trimethylolpropane di(meth)acrylate, dicyclopentenyl di(meth)acrylate, ethylene oxide-modified dicyclopentenyl di(meth)acrylate, diacryloylisocyanurate, and the like, but the monomer having two (meth)acrylic groups is not limited thereto.

Examples of the monomer having three (meth)acrylic groups may include trimethylolpropane tri(meth)acrylate, trimethylolpropane tri(meth)acrylate, pentaerythritol tri (meth)acrylate, ethylene oxide-modified trimethylol propane tri(meth)acrylate, propylene oxide-modified trimethylolpropane tri(meth)acrylate, epichlorohydrin-modified trimethylolpropane tri(meth)acrylate, epichlorohydrin-modified glycerol tri(meth) acrylate, tris(acryloyloxyethyl) isocyanurate, and the like, but the monomer having three (meth)acrylic groups is not limited thereto.

Specific examples of the (meth)acrylamide monomer may include dimethyl (meth) acrylamide, (meth) acryloylmorpholine, diethyl(meth)acrylamide, and the like, but the (meth) acrylamide monomer is not limited thereto.

Examples of the compound having a cyclic ether group such as an epoxy group, an alicyclic epoxy group and an oxetane group may include an epoxy resin, an alicyclic epoxy resin, and an oxetane resin, and the like, but the compound having a cyclic ether group is not limited thereto. In addition, two or more kinds thereof may be combined.

As the epoxy resin, it is preferable to include a compound having two or more epoxy groups in one molecule. Only one kind may be used, or two or more kinds may be mixed and used. Specific examples of the epoxy resin, which is obtained by condensation of epichlorohydrin with polyhydric phenols such as bisphenols, or polyhydric alcohols, may include, for example, glycidyl ether type epoxy resins such as bisphenol A type, brominated bisphenol A type, hydrogenated bisphenol A type, bisphenol F type, bisphenol S type, bisphenol AF type, biphenyl type, naphthalene type, fluorene type, novolac type, phenol novolac type, orthocresol novolac type, tris(hydroxyphenyl)methane type, and tetraphenylolethane type. Examples of the epoxy resin may also include glycidyl ester type epoxy resins obtained by condensation of epichlorohydrin with a carboxylic acid such as a phthalic acid derivative or a fatty acid, glycidylamine type epoxy resins obtained by reaction of epichlorohydrin with amines, cyanuric acids, or hydantoins, and epoxy resins modified by various methods, but the epoxy resin is not limited thereto.

Commercially available examples of the bisphenol type epoxy resin may include jER 827, jER 828EL, jER YL983U, and the like, as jER series manufactured by Mitsubishi Chemical Corporation, Epiclon 830, Epiclon EXA-835 LV, and the like, as Epiclon series manufactured by DIC Corporation. Epotohto YD-128, Epotohto YDF-170, and the like, as Epotohto series manufactured by Nippon Steel & Sumitomo Metal Corporation may be included, but the present invention is not limited thereto. In consideration of physical properties of a cured product, an epoxy resin having a bisphenol A skeleton or a bisphenol F skeleton is preferable. In addition, commercially available examples of the glycidylamine type epoxy resin may include EP-3950S manufactured by ADEKA Corporation, and the like, but the glycidylamine type epoxy resin is not limited thereto.

Further, the glycidylamine type epoxy resin may include a compound having one epoxy group in one molecule. The corresponding epoxy resin is also generally referred to as a reactive diluent, and specifically may include phenyl glycidyl ether, cresyl glycidyl ether, p-tert-butyl phenyl glycidyl ether, 2-ethylhexyl glycidyl ether, butyl glycidyl ether, C12 to C14 alcohol glycidyl ether, butanediglycidyl ether, hexane diglycidyl ether, cyclohexane dimethyl diglycidyl ether, glycidyl ethers based on polyethylene glycol or polypropylene glycol, neodecanoic acid glycidyl ester, and the like, but the corresponding epoxy resin is not limited thereto. From the viewpoint of low viscosity and curability, the reactive diluent is preferably used in combination with a compound having two or more epoxy groups in one molecule.

In addition, commercially available examples of the compound having one epoxy group in one molecule (reactive diluent) may include Epiol TB manufactured by NOF Corporation, CARDURA E10P manufactured by Momentive Performance Materials Inc., and the like, but the compound having one epoxy group in one molecule is not limited thereto.

The compound having an alicyclic epoxy group is mainly an epoxy compound having an epoxycyclohexyl group. Specific examples of the compound having the alicyclic epoxy group may include 3,4-epoxycyclohexylmethyl-3,4-epoxycyclohexane carboxylate, 3',4'-epoxycyclohexylmethyl-3,4-epoxycyclohexane carboxylate, bis(3,4-(epoxycyclohexylmethyl)adipate, 2-(3,4-epoxycyclohexyl-5,5-spiro-3,4-epoxy)cyclohexanone-m-dioxane, bis(2,3-epoxycyclopentyl)ether, and the like, but the compound having an alicyclic epoxy group is not limited thereto.

Commercially available examples of the compound having an alicyclic epoxy group may include X-40-2670 which is a polyfunctional alicyclic epoxy group-containing silicone oligomer manufactured by Shin-Etsu Chemical Co., Ltd., and the like. In addition, celloxide 2021P manufactured by Daicel Corporation, and the like, may be included, but the compound having an alicyclic epoxy group is not limited thereto.

Specific examples of the compound having an oxetane group may include monofunctional oxetane compounds such as 3-(meth)acryloxymethyl-3-ethyloxetane, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, and dicyclopentadiene (3-ethyl-3-oxetanylmethyl)ether, bifunctional oxetane compounds such as 3,7-bis(3-oxetanyl)-5-oxa-nonane, 1,2-bis[(3-ethyl-3-oxetanylmethoxy)methyl]ethane, 1,2-bis[(3-ethyl-3-oxetanylmethoxy)methyl]propane, dicyclopentenylbis(3-ethyl-3-oxetanylmethyl)ether, 1,4-bis[(3-ethyl-3-oxetanylmethoxy)methyl]butane, and 1,6-bis [(3-ethyl-3-oxetanylmethoxy)methyl]hexane, polyfunctional oxetane compounds such as trimethylolpropane tris(3-ethyl-3-oxetanylmethyl) ether, pentaerythritol tris(3-ethyl-3-oxetanylmethyl) ether, pentaerythritol tetrakis(3-ethyl-3-oxetanylmethyl) ether, and dipentaerythritol hexakis (3-ethyl-3-oxetanylmethyl) ether, but the compound having an oxetane group is not limited thereto. From the viewpoint of low viscosity and curability, it is preferable to combine a compound having an alicyclic epoxy group and a compound having an oxetane group.

Commercially available examples of the compound having an oxetane group may include Aron oxetane series OXT-211, OXT-221, and the like, manufactured by Toagosei Company, Limited, but the compound having an oxetane group is not limited thereto.

The component (B) which can be used in the present invention is a thermal curing agent which cures the curable resin which is the component (A). When the component (A) is a compound having a (meth)acrylic group, the component (B) is preferably an organic peroxide. When the component (A) is a compound having a cyclic ether group, the component (B) is a latent curing agent, and when the component (A) is a compound having at least one group selected from the group consisting of an epoxy group, an alicyclic epoxy group, and an oxetane group, an amine compound (having thermocurability) or a cation catalyst is preferable as the latent curing agent which is the component (B). That is, in the thermocurable electroconductive adhesive of the present invention, although there is no clear reason for this, even in the case where the adherend is nickel or the like, it is possible to reduce connection resistance and have excellent storage stability by combining the compound (A) which is various kinds of thermocurable curing resins such as a compound having a (meth) acrylic group and a compound having a cyclic ether group, with the component (B) which is a thermal curing agent, in particular, a thermal curing agent which is optimized for each of the above-described components (A), and further components (C) and (D) to be described below.

The organic peroxide that can be used in the present invention is preferably an organic peroxide having a structure of General Formula 1 below. Particularly preferred is an organic peroxide having a structure of General Formula 2 below. By using the organic peroxide, although there is no clear reason for this, it is possible to remarkably express an effect of lowering the above-described connection resistance and having excellent storage stability. Here, $R^1$ and $R^2$ are each an independent hydrocarbon group, and may be linear or cyclic. Examples of the organic peroxide may include di-n-propyl-peroxydicarbonate, di-iso-propyl-peroxydicarbonate, di(4-t-butylcyclohexyl)peroxydicarbonate, di(2-ethylhexyl)peroxydicarbonate, di-sec-butyl-peroxydicarbonate, and the like, but the organic peroxide is not limited thereto.

[Chemical Formula 1]

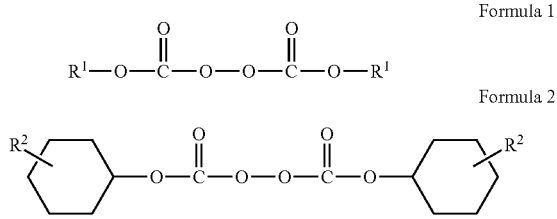

Formula 1

Formula 2

Specific examples of the organic peroxide may include NPP-50M, IPP-50, IPP-27, TCP, OPP, SBP, and the like, as Peroyl series manufactured by NOF Corporation, but the organic peroxide is not limited thereto.

When the component (A) is a compound having a (meth) acrylic group, it is preferable to include 1 to 10 parts by mass of the organic peroxide which is the component (B), more preferable to include 2 to 9 parts by mass of the organic peroxide, and further more preferable to include 3 to 8 parts by mass of the organic peroxide with respect to a total of 100 parts by mass of the component (A). When the amount of component (B) is 1 part by mass or more, low-temperature curability can be exhibited, and when the amount of component (B) is 10 parts by mass or less, storage stability can be maintained.

An amine compound having thermocurability as the latent curing agent may be a powder pulverized into a powder form. In other words, in a one-pack type epoxy resin in which the curing agent which is a solid at 25° C. is dispersed in an epoxy resin which is a liquid at 25° C., a curing agent capable of securing storage stability such as little change in viscosity or little change in physical properties over time, is referred to as a latent curing agent. Specifically, the latent curing agent may include an epoxy adduct-type latent curing agent which is a powder obtained by pulverizing an epoxy adduct compound obtained by adding a tertiary amine to an imidazole derivative or an epoxy resin in the form of a powder at room temperature and stopping the reaction, and the like, but the present invention is not limited thereto. Particularly preferably, commercially available examples of the epoxy adduct-type latent curing agent may include Amicure series manufactured by Ajinomoto Fine-Techno Co., Inc., Fujicure series (FXR-1081, and the like) manufactured by T&K TOKA Co., Ltd., Novacure series manufactured by Asahi Kasei Chemicals Corporation, and the like. It is preferably an amine compound that starts the reaction at 100° C. or lower, and more preferably an amine compound that starts the reaction at 90° C. or lower.

Examples of the thermocurable cation catalyst may include salts including cationic species such as dinonylnaphthalenedisulfonic acid, dinonylnaphthalenesulfonic acid, p-toluenesulfonic acid, antimony hexafluoride, trifluoromethanesulfonic acid, perfluorobutanesulfonic acid, bis (trifluoromethane sulfonic acid)imide, tetrakis pentafluorophenylate and borate (tetrakis(pentafluorophenyl) borate; B $(C_6F_5)_4^-$), and cationic species such as an amine, quaternary ammonium, and metal, but the thermocurable cation catalyst is not limited thereto. Specific examples of the cation catalyst may include TAG-2713, CXC-1820, TAG-2172, TAG-2507, CXC-1612, CXC-1615, TAG-2678, CXC-1614, TAG-2689, CXC-2689C, TAG-2690, CXC-1742, CXC-1613, CXC-1821, CXC-1756, CXC-1765 as K-PURE series manufactured by King Industries, Inc., but the cation catalyst is not limited thereto.

When the component (A) is a compound having a cyclic ether group, the latent curing agent which is the component (B) is preferably included in an amount of 1 to 30 parts by mass, more preferably 2 to 26 parts by mass, and much more preferably 3 to 25 parts by mass with respect to 100 parts by mass of the component (A). When the amount is 1 part by mass or more, curability is not deteriorated, and when the amount is 30 parts by mass or less, storage stability can be maintained.

Further, in the case where the component (A) is a compound having a cyclic ether group to the extent that the properties of the present invention are not impaired, a curing agent such as an acid anhydride, a phenol compound, or a thiol compound, may be also included in addition to the latent curing agent. Since curing is generally slow even when the liquid curing agent is used alone, it is known to use the latent curing agent as a curing accelerator together with the liquid curing agent.

The component (C) that can be used in the present invention is an organometallic complex. Although there is no clear reason for this, the connection resistance to the adherend of which an outermost surface is nickel is lowered by adding the component (C). The metal included in the component (C) is a divalent metal or a trivalent metal, and specific examples of the metal may include zinc, aluminum, iron, cobalt, nickel, tin, copper, and the like. Although there is no clear reason for this, by adding the organometallic complex including the above-described divalent metal or trivalent metal as the component (C), even though the adherend has an outermost surface being nickel, it is possible to reduce connection resistance in various kinds of thermocurable curing resins while simultaneously maintaining storage stability and having good handleability. Further, in the present invention, it is preferable that the component (C) is an organometallic complex including an organic ligand having an alkoxy group and/or a carboxylate group. Specifically, examples of the (organic) ligand may include acetate, acetyl acetate, hexanoate, phthalocyaninoate, and the like, but the (organic) ligand is not limited thereto. Although there is no clear reason for this, by adding the organometallic complex including the above-described divalent metal or trivalent metal as the component (C), even though the adherend has an outermost surface being nickel, it is possible to reduce connection resistance in various kinds of thermocurable curing resins while simultaneously maintaining storage stability and having good handleability.

Examples of the component (C) may include copper oleate (divalent), zinc acetylacetate (zinc acetylacetonate) (divalent), aluminum acetylacetate (aluminum acetylacetonate) (trivalent), cobalt acetylacetate (cobalt acetylacetonate) (divalent), nickel acetate (divalent), nickel acetylacetate (nickel acetylacetonate) (divalent), iron phthalocyanine (divalent), dibutyltin dilaurate (divalent), and the like, but the component (C) is not limited thereto.

Examples of commercially available organometallic complex of the component (C) may include Nacem zinc (zinc acetylacetonate (divalent)), Nacem aluminum (aluminum acetylacetonate (trivalent)), Nacem cobalt (II) (cobalt acetylacetonate (divalent)), Nacem nickel (nickel acetylacetonate (divalent)) manufactured by Nihon Kagaku Sangyo Co., Ltd., and the like. In addition, KS-1260 (dibutyltin dilaurate (divalent)) manufactured by Kyodo Chemical Co., Ltd., and the like, may be included, but these organometallic complexes are not limited thereto.

Specific examples of the component (C) may include Nacem Zn, Nacem AL, Nacem Co, and Nacem Ni manufactured by Nihon Kagaku Sangyo Co., Ltd., and the like, as acetylacetone metal complex series, and may include KS-1260 manufactured by Kyodo Chemical Co., Ltd., and the like, as octylic acid metal soap series, but the component (C) is not limited thereto.

It is preferable that the component (C) is included in an amount of 0.01 to 20 parts by mass, more preferably 0.1 to 15 parts by mass, and particularly preferably 0.5 to 10 parts by mass with respect to 100 parts by mass of the component (B). When the component (C) is included in an amount of 0.01 parts by mass or more, the connection resistance may be reduced, and when the component (C) is included in an amount of 20 parts by mass or less, the storage stability may be maintained.

The component (D) that can be used in the present invention is electroconductive particles. Although there is no clear reason for this, since the electroconductive particles surface-treated with stearic acid have an effect of improving storage stability, it is preferable to use electroconductive particles surface-treated with stearic acid as the component (D). Electroconductive particles are sufficient as long as electrical conductivity is exhibited, and a material of the particles and a shape of the particles are not limited. Examples of the material of the electroconductive particles may include silver powder, nickel powder, palladium powder, carbon powder, tungsten powder, plating powder, and the like, and silver powder having excellent electrical conductivity is particularly preferred. Further, examples of the shape of the electroconductive particle may include a spherical shape, an amorphous shape, a flaky (scaly) shape, a filamentous shape (needle-like), a resin shape, and the like. A plurality of kinds thereof may be combined and used. In particular, electroconductive particles obtained by silver-plating powders of insulating metal oxide, nickel powder, or an insulator are preferable since raw material costs are low. Specific examples of the insulating metal oxide may include copper powder, aluminum powder, iron powder, and the like, and the insulating metal oxide is a metal in which a passive state is formed on a metal surface so that conductivity is not exhibited. In order to knead the resin component, it is preferable that the 50% average particle diameter (d50) is 100 μm or less. In consideration of cost and conductivity, it is preferable that the component (D) is at least one of silver powder surface-treated with stearic acid and silver plating powder surface-treated with stearic acid. Here, the average particle diameter is measured with a laser particle size analyzer, scanning electron microscope (SEM), or the like, but these apparatuses are not limited thereto.

As a method of surface-treating electroconductive particles with a lubricant such as stearic acid, there is known a method of treating a stearic acid diluted in a solvent together with the electroconductive particles using a ball mill, or the like, and then drying the solvent, and the like, but the method is not limited thereto.

The component (D) is preferably included in an amount of 100 to 1000 parts by mass, and more preferably 200 to 600 parts by mass, with respect to 100 parts by mass of the component (A). When the component (D) is included in an amount of 100 parts by mass or more, conductivity is exhibited, whereas when the component (D) is included in an amount of 1000 parts by mass or less, being stringy, and the like, do not occur, and thus there are no problems in workability.

Further, as a component (E), a stabilizer may be added to the extent that the properties of the present invention are not impaired. When the component (A) is a compound having a (meth)acrylic group, a phosphoric acid ester compound, a polymerization inhibitor, a chelating agent, and the like, are included as the component (E), but the present invention is not limited thereto. The polymerization inhibitor can also be used to capture occurring radical species to maintain storage stability. In addition, a chelating agent can be used to capture occurring metal ions.

When the component (A) is a compound having a (meth) acrylic group, a phosphoric acid ester compound can be added as the component (E). Specifically, the compound is a compound represented by General Formula 3 below. Here, $R^3$ represents an organic group, and n represents 1 or 2. Although there is no clear reason for this, the phosphoric acid ester compound has an effect of improving storage stability. Examples of the phosphoric acid ester compound as the component (E) may include ethyl acid phosphate, butyl acid phosphate, butoxyethyl acid phosphate, oleyl acid phosphate, 2-ethylhexyl acid phosphate, 2-hydroxyethyl methacrylate acid phosphate, dibutyl phosphate, and the like, but the phosphoric acid ester compound is not limited thereto. The phosphoric acid ester compound as the component (E) is preferably a phosphoric acid ester compound having a (meth) acrylic group in a molecule, as represented by General Formula 4 below. Here, $R^4$ represents hydrogen or a methyl group, $R^5$ represents a divalent hydrocarbon group, and n represents 1 or 2. Since the compound of General Formula 4 is used and involved in the radical polymerization at the time of curing, when a cured product is heated, there is no volatilization other than the cured product, and thus an occurrence of out gas can be reduced.

[Chemical Formula 2]

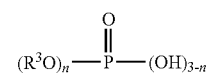

Formula 3

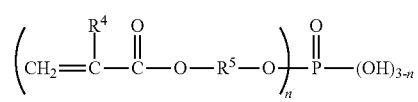

Formula 4

Specific examples of the polymerization inhibitor of the component (E) may include quinone-based polymerization inhibitors such as hydroquinone, methoxyhydroquinone, benzoquinone, and p-tert-butylcatechol, alkylphenol-based polymerization inhibitors such as 2,6-di-tert-butylphenol, 2,4-di-tert-butylphenol, 2-tert-butyl-4,6-dimethylphenol, 2,6-di-tert-butyl-4-methylphenol (BHT), and 2,4,6-tri-tert-butylphenol, amine-based polymerization inhibitors such as alkylated diphenylamine, N,N'-diphenyl-p-phenylenediamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, and 1-hydroxy-4-benzoyloxy-2,2,6,6-tetramethylpiperidine, N-oxyl-based polymerization inhibitors such as 2,2,6,6-tetramethylpiperidine-N-oxyl, 4-hydroxy-2,2,6,6-tetramethylpiperidine-N-oxyl, and 4-benzoyloxy-2,2,6,6-tetramethylpiperidine-N-oxyl, but the polymerization inhibitor of the component (E) is not limited thereto.

Specific examples of the chelating agent of the component (E) may include EDTA-2Na, EDTA-4Na (4NA: ethylenediamine-N,N,N',N'-tetraacetic acid tetrasodium salt tetrahydrate), and the like, manufactured by Dojindo Molecular Technologies, Inc., and specific examples of the chelating agent which is a liquid form at 25° C. may include MZ-8 manufactured by Chelest Corporation, and the like, but these chelating agents are not limited thereto.

When the component (A) is a compound having a cyclic ether group, a reaction inhibitor as the component (E) can be added as a stabilizer. The reaction inhibitor is a compound that inhibits the reaction between the component (A) and the component (B). As the reaction inhibitor, boric acid ester, phosphoric acid, alkyl phosphoric acid ester, p-toluenesulfonic acid, methyl p-toluenesulfonate, and the like, may be used. Examples of the boric acid ester may include tributyl borate, trimethoxyboroxine, ethyl borate, an epoxy-phenol-boric acid ester blend (Cureduct L-07N manufactured by Shikoku Chemicals Corporation), and the like, but the boric acid ester is not limited thereto. As the alkyl phosphoric acid ester, trimethyl phosphate, tributyl phosphate, and the like, may be used, but the alkyl phosphoric acid ester is not limited thereto. The component (E) may be used alone or in combination of two or more thereof. In consideration of the storage stability, phosphoric acid, tributyl borate (boric acid tributyl), trimethoxyboroxine, or methyl p-toluenesulfonate is preferable.

If an addition amount of the stabilizer of the component (E) is excessively large, the storage stability is improved, whereas there are adverse effects in which reactivity is slow, curing is not performed, and the like. Thus, it is preferable to add the component (E) in an amount of 0.001 to 5.0 parts by mass, more preferably 0.01 to 4.5 parts by mass, and further preferably 0.1 to 4.0 parts by mass with respect to 100 parts by mass of the component (A).

A filler other than the electroconductive particles which is the component (D) may be added to the extent that the properties of the present invention are not impaired. The filler other than the electroconductive particles which are the component (D) may be an inorganic filler, an organic filler, or the like, but the filler is not limited thereto. Examples of the inorganic filler may include metal powder that does not exhibit conductivity (metal powder in which a powder surface forms a passive state due to oxidation), alumina powder, calcium carbonate powder, talc powder, silica powder, fumed silica powder, and the like, and examples of the organic filler may include acrylic particles, rubber particles, styrene particles (particle materials used as being dispersed as they are as a filler), and the like, but these fillers are not limited thereto. By adding the filler, viscosity and a thixotropic property can be controlled while simultaneously achieving improvement of strength. Powder properties such as an average particle diameter and a shape, are not particularly limited, but in consideration of ease of dispersion with respect to the composition and nozzle clogging, a 50% average particle diameter (d50) is preferably 0.001 to 50 μm. In particular, by adding the fumed silica powder, the thixotropic property is imparted, and at the same time, the storage stability is maintained. Specific examples of the fumed silica powder may include, AEROSIL R805, AEROSIL R972 manufactured by Nippon Aerosil Co., Ltd., and the like, but the fumed silica powder is not limited thereto. Here, the average particle diameter is measured with a laser particle size analyzer, a scanning electron microscope (SEM), or the like, but these apparatuses are not limited thereto.

It is preferable that 0.1 to 10 parts by mass of a filler other than the component (D) is added with respect to 100 parts by mass of the component (A). When an amount of the filler is 0.1 parts by mass or more, fluidity can be stabilized and workability can be improved, and when the amount of the filler is 10 parts by mass or less, storage stability can be maintained.

In the composition (thermocurable electroconductive adhesive) of the present invention, additives such as a coloring agent such as a pigment and a dye, a flame retardant, an antioxidant, a defoaming agent, a coupling agent, a leveling agent, and a rheology control agent, may be blended each in an appropriate amount to the extent that the properties of the present invention are not impaired. By these additions, it is possible to obtain an adhesive or a cured product thereof in which conductivity, resin strength, adhesive strength, workability, storage stability, and the like are excellent. However, it is preferable not to include a rubber, an elastomer and a thermoplastic resin (materials used by being dissolved (compatible) with acryl or epoxy) since workability such as stringing, are hindered due to increased viscosity. Here, the rubber is not particularly limited, and examples of the rubber may include natural rubber; synthetic rubbers such as isoprene rubber, butadiene rubber, styrene•butadiene rubber, chloroprene rubber, nitrile rubber, polyisobutylene (butyl rubber), ethylene propylene rubber, chlorosulfonated polyethylene, acrylic rubber, fluorine rubber, epichlorohydrin rubber, urethane rubber, and silicone rubber. The elastomer is not particularly limited, and examples of the elastomer may include (thermoplastic) elastomers such as a styrene-based elastomer, an olefin/alkene-based elastomer, a vinyl chloride-based elastomer, a urethane-based elastomer, an amide-based elastomer, and the like. The thermoplastic resin is not particularly limited, and examples thereof may include polyalkylene such as polyethylene, high density polyethylene, medium density polyethylene, low density polyethylene, polypropylene, or the like, polyester such as polyvinyl chloride, polyvinylidene chloride, polystyrene, polyvinyl acetate, polyurethane, polytetrafluoroethylene, ABS (acrylonitrile butadiene styrene) resin, AS (acrylonitrile styrene) resin, acrylic resin, polyamide, polyacetal, polycarbonate, modified polyphenylene ether, polyethylene terephthalate, glass fiber-reinforced polyethylene terephthalate, polybutylene terephthalate, and the like, cyclicpolyolefin, polyphenylene sulfide, polytetrafluoroethylene, polysulfone, polyethersulfone, amorphous polyarylate, liquid crystal polymer, polyether ether ketone, thermoplastic polyimide, and polyamide imide. These are materials used by being dissolved (compatible) with acrylic or epoxy as described above.

Further, it is preferable that the thermocurable electroconductive adhesive of the present invention does not include a reducing agent. In the thermocurable electroconductive adhesive of the present invention having the above-described constitution, although there is no clear reason for this, even in the case where the adherend is nickel or the like, the connection resistance can be lowered by using various kinds of thermocurable curing resins even though the reducing agent is not included. Here, the reducing agent is not particularly limited, and examples of the reducing agent may include iron (II) ion, lithium aluminum hydride ($LiAlH_4$), sodium amalgam, sodium borohydride ($NaBH_4$), tin (II) ions, sulfite, hydrazine (Wolff-Kishner reduction), zinc amalgam (Zn(Hg)) (Clemmensen Reduction), diisobutylaluminum hydride (DIBAH), oxalic acid ($C_2H_2O_4$), formic acid (HCOOH), gallic acid (3,4,5-trihydroxybenzoic acid), and the like.

Further, the thermocurable electroconductive adhesive of the present invention is preferably used for an adherend of which an outermost surface is nickel. In the thermocurable electroconductive adhesive of the present invention having the above-described constitution, although there is no clear reason for this, even though the adherend has an outermost surface being nickel, it is possible to reduce connection resistance in various kinds of thermocurable curing resins while simultaneously maintaining storage stability and having good handleability. Here, the adherend of which the outermost surface of nickel is not particularly limited, and is primarily an adherend plated with nickel. Examples of the adherend may include adherends obtained by performing electrolytic plating or electroless plating (electric wire, printed circuit (base) board, and the like), with respect to a cold rolled steel plate (SPCC), members made of stainless steel or copper, and the like.

EXAMPLE

Hereinafter, the present invention is described in more detail with reference to the following Examples, but the technical scope of the present invention is not limited to these Examples only. Hereinafter, the prepared thermocurable electroconductive adhesive is also simply referred to as a composition.

Examples 1 to 10 and Comparative Example 1

In order to prepare the compositions of Examples 1 to 10 and Comparative Example 1, the following components were prepared.
Component (A): Curable Resin
Aromatic urethane acrylate (Evecryl 220 manufactured by Daicel Ornex Corporation) having 6 functional groups (acrylic groups) in a molecule, which is a urethane-modified oligomer having a (meth)acrylic group
2-Hydroxyethyl methacrylate (HEMA manufactured by Nippon Shokubai Co., Ltd.)
Component (B): Thermal Curing Agent that Cures Component (A)
Bis(4-t-butylcyclohexyl)peroxydicarbonate (solid at 25° C.) (Peroyl TCP manufactured by NOF Corporation) (One kind of organic peroxide having a structure of General Formula 2)
Component (C): Organometallic Complex
Zinc acetyl acetonate (divalent) (Nacem zinc manufactured by Nihon Kagaku Sangyo Co., Ltd.)
Aluminumacetyl acetonate (trivalent) (Nacem aluminum manufactured by Nihon Kagaku Sangyo Co., Ltd.)
Iron phthalocyanine (divalent) reagent
Cobalt acetylacetonate (divalent) (Nacem cobalt (II) manufactured by Nihon Kagaku Sangyo Co., Ltd.)
Nickelacetyl acetonate (divalent) (Nacem nickel manufactured by Nihon Kagaku Sangyo Co., Ltd.)
Nickel acetate (divalent) reagent
Dibutyltindilaurate (divalent) (KS-1260 manufactured by Kyodo Chemical Co., Ltd.)
Copper oleate (divalent) reagent
Component (D): Electroconductive Particles
Silver powder 1: Flake shaped silver powder surface-treated with stearic acid having the following powder properties
Tap density: 3.17 g/cm$^3$
50% average particle diameter (d50): 5.0 μm (laser particle size analyzer)
BET specific surface area: 0.67 m$^2$/g
Silver powder 2: Flake shaped silver powder surface-treated with stearic acid having the following powder properties
Tap density: 3.57 g/cm$^3$
50% average particle diameter (d50): 1.2 μm (laser particle size analyzer)
BET specific surface area: 2.01 m$^2$/g
Other Components; Component (E): Stabilizer
2-Hydroxyethyl methacrylate acid phosphate (JPA-514 manufactured by Johoku Chemical Co., Ltd.)
2,6-di-tert-butyl-4-methylphenol (BHT) (reagent)
Ethylenediamine-N,N,N',N'-tetraacetic acid tetrasodium salt tetrahydrate (solid at 25° C.) (4NA (EDTA.4Na) manufactured by Dojindo Molecular Technologies, Inc.).

Compositions of Examples 1 to 10 and having the compound having a (meth) acrylic group as the component (A) and Comparative Example 1 were prepared. Specifically, the components (A), (B), and (C), and other components (E) were weighed, put into a stirring pot, and stirred for 1 hour. Then, the component (D) was weighed and put into a stirring pot to prepare compositions of Examples 1 to 10 and Comparative Example 1 ((meth) acrylic resin compositions as thermocurable electroconductive adhesives). In addition, addition amounts of the component (C) to 100 parts by mass of component (B) are also shown in Tables 1-1 to 1-2. Detailed preparation amounts are the same as shown in Tables 1-1 to 1-2, and numerical values are all expressed in parts by mass.

TABLE 1-1

| Component | Raw material | Example 1 | Example 2 | Example 3 | Example 4 | Example 5 | Example 6 |
|---|---|---|---|---|---|---|---|
| Component (A) | Ebecryl 220 | 50 | 50 | 50 | 50 | 50 | 50 |
| | HEMA | 50 | 50 | 50 | 50 | 50 | 50 |
| Component (B) | TCP | 5 | 5 | 5 | 5 | 5 | 5 |
| Component (C) | Nacem zinc | 0.05 | 0.1 | 0.5 | | | |
| | Nacem aluminum | | | | 0.05 | | |
| | Iron phthalocyanine | | | | | 0.05 | |
| | Nacem cobalt (II) | | | | | | 0.05 |
| | Nacem nickel | | | | | | |
| | Nickel acetate | | | | | | |
| | KS-1260 | | | | | | |
| | Copper oleate | | | | | | |
| Component (D) | Silver powder 1 | 250 | 250 | 250 | 250 | 250 | 250 |
| | Silver powder 2 | 70 | 70 | 70 | 70 | 70 | 70 |

TABLE 1-1-continued

| Component | Raw material | Example 1 | Example 2 | Example 3 | Example 4 | Example 5 | Example 6 |
|---|---|---|---|---|---|---|---|
| Other component (E) | JPA-514 | 0.05 | 0.05 | 0.05 | 0.05 | 0.05 | 0.05 |
|  | BHT | 0.1 | 0.1 | 0.1 | 0.1 | 0.1 | 0.1 |
|  | 4NA | 0.1 | 0.1 | 0.1 | 0.1 | 0.1 | 0.1 |
| Total |  | 425.30 | 425.35 | 425.75 | 425.30 | 425.30 | 425.30 |
| Added amount of component (C) to 100 parts by mass of component (B) |  | 1.0 | 2.0 | 10.0 | 1.0 | 1.0 | 1.0 |
| Added amount of component (D) to 100 parts by mass of component (A) |  | 320 | 320 | 320 | 320 | 320 | 320 |

TABLE 1-2

| Component | Raw material | Example 7 | Example 8 | Example 9 | Example 10 | Comparative Example 1 |
|---|---|---|---|---|---|---|
| Component (A) | Ebecryl 220 | 50 | 50 | 50 | 50 | 50 |
|  | HEMA | 50 | 50 | 50 | 50 | 50 |
| Component (B) | TCP | 5 | 5 | 5 | 5 | 5 |
| Component (C) | Nacem zinc |  |  |  |  |  |
|  | Nacem aluminum |  |  |  |  |  |
|  | Iron phthalocyanine |  |  |  |  |  |
|  | Nacem cobalt (II) |  |  |  |  |  |
|  | Nacem nickel | 0.05 |  |  |  |  |
|  | Nickel acetate |  | 0.05 |  |  |  |
|  | KS-1260 |  |  | 0.05 |  |  |
|  | Copper oleate |  |  |  | 0.05 |  |
| Component (D) | Silver powder 1 | 250 | 250 | 250 | 250 | 250 |
|  | Silver powder 2 | 70 | 70 | 70 | 70 | 70 |
| Component (E) | JPA-514 | 0.05 | 0.05 | 0.05 | 0.05 | 0.05 |
|  | BHT | 0.1 | 0.1 | 0.1 | 0.1 | 0.1 |
|  | 4NA | 0.1 | 0.1 | 0.1 | 0.1 | 0.1 |
| Total |  | 425.30 | 425.30 | 425.30 | 425.30 | 425.25 |
| Added amount of component (C) to 100 parts by mass of component (B) |  | 1.0 | 1.0 | 1.0 | 1.0 | 1.0 |
| Added amount of component (D) to 100 parts by mass of component (A) |  | 320 | 320 | 320 | 320 | 320 |

The storage stability was confirmed, the volume resistivity was measured, and the connection resistance was measured with respect to the compositions (or cured products thereof) of Examples 1 to 10 and Comparative Example 1. Results thereof are summarized in Tables 2-1 and 2-2.

[Confirmation of Storage Stability]

After stirring with a rod made of polytetrafluoroethylene, 2.0 cc of the composition was weighed and the viscosity was measured using Brookfield (model number: DV-2+Pro) in a state in which temperature was set at 25° C. with a temperature controller. As measurement conditions, CPE-41 (3°×R2.4) was used for a cone rotor, and the rotation speed was 10 rpm. The viscosity after 3 minutes is defined as "initial viscosity (Pa·s)". Thereafter, a container containing the composition was stored in an atmosphere at 25° C., and the viscosity was measured until the viscosity reached a value twice as or higher than the initial viscosity (including a state in which gelation occurs in the composition even without thickening). The viscosity was measured every 24 hours from the start of storage and the viscosity was measured in the same manner as the measurement of the initial viscosity. It was determined that stability deteriorated at the time when the viscosity increased to the value twice as or higher than the initial viscosity, and thus the time before the viscosity reached to the value twice as the initial viscosity was defined as "storage stability (time)". It is preferable to maintain the storage stability for 48 hours or more, and more preferable to maintain the storage stability for 72 hours or more.

[Measurement of Volume Resistivity]

A masking tape (50 μm of thickness) was attached to a glass plate having a thickness of 2.0 mm, a width of 50 mm, and a length of 100 mm so as to have a length of 100 mm and a width of 10 mm, and the composition (thermocurable electroconductive adhesive) was squeezed to form a uniform coating film to manufacture a test piece (n=2). The test piece was placed on a hot plate set at 130° C. and left for 30 seconds, then the test piece was removed from the hot plate. After the temperature of the test piece decreased to 25° C., a "resistance value (Ω)" was measured in a state in which a distance between the electrodes was 50 mm using a dual display multimeter with a plate-like electrode attached thereto. The volume resistivity was calculated from (resistance value)×(width of the cured product of the composition×thickness (sectional area) of the cured product of the composition)/(distance between the electrodes) and was defined as "conductivity ($\times 10^{-6}$ Ω·m)". From the viewpoint of securing conductivity, the conductivity is preferably $1000 \times 10^{-6}$ Ω·m or less.

[Measurement of Connection Resistance]

In a masking tape having a width of 10 mm and a thickness of 100 μm, five holes with a diameter of 5 mm were drilled at an interval of 10 mm along a length direction. The masking tape was attached to an electroless nickel-plated plate having a width of 25 mm, a length of 100 mm, and a thickness of 1.6 mm, the composition (thermocurable electroconductive adhesive) was squeezed, and then the masking tape was peeled off. The test piece was placed on a hot plate set at 130° C. and left for 30 seconds, then the test piece was removed from the hot plate. The cured product of the adjacent composition was brought into contact with the needle electrode of the dual display multimeter and the resistance was measured to be defined as "connection resistance (mΩ)". The connection resistance is preferably 100 mΩ or less for stabilizing the conductivity.

TABLE 2-1

| Test items | Example 1 | Example 2 | Example 3 | Example 4 | Example 5 | Example 6 |
|---|---|---|---|---|---|---|
| Storage stability (hours) | 120 | 96 | 72 | 168 | 48 | 168 |
| Conductivity (×10$^{-6}$ Ω · m) | 1.9 | 1.2 | 1.1 | 1.9 | 2.5 | 1.9 |
| Connection resistance (mΩ) | 16 | 43 | 28 | 19 | 88 | 42 |

TABLE 2-2

| Test items | Example 7 | Example 8 | Example 9 | Example 10 | Comparative Example 1 |
|---|---|---|---|---|---|
| Storage stability (hours) | 168 | 168 | 96 | 96 | 168 |
| Conductivity (×10$^{-6}$ Ω · m) | 1.8 | 1.8 | 2.5 | 2.5 | 2.2 |
| Connection resistance (mΩ) | 69 | 26 | 75 | 54 | 130 |

When comparing Examples 1 to 10 including the compound having a (meth)acrylic group as the component (A) with Comparative Example 1, it could be appreciated that the connection resistance value at the interface of the adherend was significantly different depending on the presence or absence of the component (C). On the other hand, regarding the storage stability before curing and the conductivity after curing in the composition, there is no difference between Examples and Comparative Example.

Examples 11 to 14 and Comparative Examples 2 and 3

In order to prepare the compositions of Examples 11 to 14 and Comparative Examples 2 and 3, the following components were prepared.

Component (A): Curable Resin
3-ethyl-3 phenoxymethyloxetane (ARON OXETANE OXT-211 manufactured by Toagosei Company, Limited)
3-ethyl-3{[(3-ethyloxetan-3-yl)methoxy]methyl}oxetane (ARON OXETANE OXT-221 manufactured by Toagosei Company, Limited)
Polyfunctional alicyclic epoxy-containing silicone oligomer (X-40-2670 manufactured by Shin-Etsu Chemical Co., Ltd.)
3',4'-Epoxycyclohexylmethyl-3,4-epoxycyclohexanecarboxylate (celloxide 2021P manufactured by Daicel Corporation)
Glycidylamine type epoxy resin (EP-3950S manufactured by ADEKA Co., Ltd.)
Bisphenol F type epoxy resin (Epiclon EXA-835LV manufactured by DIC Corporation)
p-tert-butylphenyl glycidyl ether (Epiol TB manufactured by NOF Corporation)
Neodecanoic acid glycidyl ester (CARDURA E10P manufactured by Momentive Performance Materials Inc.)

Component (B): Thermal Curing Agent that Cures Component (A)
Salt (K-PURE CXC-1821 manufactured by KING INDUSTRIES) including tetrakis pentafluorophenylate borate (tetrakis(pentafluorophenyl) borate); $B(C_6F_5)_4^-$ as anionic species and quaternary ammonium as cationic species.

Latent curing agent composed of a modified amine compound which is solid at 25° C. (Fujicure-FXR-1081 manufactured by T&K TOKA Co., Ltd.)

Component (C): Organometallic Complex
Zinc acetyl acetonate (divalent) (Nacem zinc manufactured by Nihon Kagaku Sangyo Co., Ltd.)
Nickelacetyl acetonate (divalent) (Nacem nickel manufactured by Nihon Kagaku Sangyo Co., Ltd.)
Copper oleate (divalent) reagent Component (D): Electroconductive Particles
Silver powder 1: Flake shaped silver powder surface-treated with stearic acid having the following powder properties
Tap density: 3.17 g/cm$^3$
50% average particle diameter (d50): 5.0 μm (laser particle size analyzer)
BET specific surface area: 0.67 m$^2$/g
Silver powder 3: Spherical silver powder with the following powder properties
Tap density: 6.1 g/cm$^3$
50% average particle diameter (d50): 3.5 μm (laser particle size analyzer)
BET specific surface area: 0.2 m$^2$/g
Silver powder 4: Flake shaped silver powder with the following powder properties
Tap density: 5.0 g/cm$^3$
50% average particle diameter (d50): 5.7 μm (laser particle size analyzer)
BET specific surface area: 0.4 m$^2$/g Other Components: Stabilizer; Component (E)
Epoxy-phenol-boric acid ester blend (Cureduct L-07N manufactured by Shikoku Chemicals Corporation)

Examples 11 to 14 and Comparative Examples 2 to 3 each having a compound having a cyclic ether group as the component (A) were prepared. Specifically, the components (A), (B), and (C), and other component (E) were weighed, put into a stirring pot, and stirred for 1 hour. Then, the component (D) was weighed and put into a stirring pot to prepare compositions of Examples 11 to 14 and Comparative Examples and 3 (epoxy resin compositions as thermocurable electroconductive adhesives). Detailed preparation amounts are the same as shown in Table 3, and numerical values are all expressed in parts by mass.

TABLE 3

| Component | Raw material | Example 11 | Example 12 | Example 13 | Example 14 | Comparative Example 2 | Comparative Example 3 |
|---|---|---|---|---|---|---|---|
| Component (A) | OXT211 | 30 | 30 | 30 | | 30 | |
| | OXT221 | 17 | 17 | 17 | | 17 | |
| | X-40-2670 | 29 | 29 | 29 | | 29 | |
| | 2021P | 8 | 8 | 8 | | 8 | |
| | EP-3950S | 16 | 16 | 16 | | 16 | |
| | EXA-835LV | | | | 82 | | 82 |
| | TB | | | | 2 | | 2 |
| | E10P | | | | 16 | | 16 |
| Component (B) | K-PURE 1821 | 5 | 5 | 5 | | 5 | |
| | FXR-1081 | | | | 23 | | 23 |
| Component (C) | Nacem nickel | 0.3 | | | 0.15 | | |
| | Nacem zinc | | 0.3 | | | | |
| | Copper oleate | | | 0.3 | | | |
| Component (D) | Silver powder 1 | 100 | 100 | 100 | 40 | 100 | 40 |
| | Silver powder 3 | 50 | 50 | 50 | 50 | 50 | 50 |
| | Silver powder 4 | 400 | 400 | 400 | 240 | 400 | 240 |
| Other; Component (E) | L-07N | | | | 2 | | 2 |
| Total | | 655.3 | 655.3 | 655.3 | 455.2 | 655.0 | 455.0 |
| Added amount of component (C) to 100 parts by mass of component (B) | | 6.0 | 6.0 | 6.0 | 0.7 | 0.0 | 0.0 |
| Added amount of component (D) to 100 parts by mass of component (A) | | 550 | 550 | 550 | 330 | 550 | 330 |

The storage stability was confirmed, the volume resistivity was measured, and the connection resistance was measured with respect to the compositions (or cured products thereof) of Examples 11 to 14 and Comparative Examples 2 and 3. However, curing conditions of the composition in the volume resistivity measurement and connection resistance measurement are set to conditions of heating at 120° C. for 20 seconds and then heating at 80° C. for 30 minutes. Results thereof are summarized in Table 4.

TABLE 4

| Test items | Example 11 | Example 12 | Example 13 | Example 14 | Comparative Example 2 | Comparative Example 3 |
|---|---|---|---|---|---|---|
| Storage stability (hours) | 120 | 120 | 72 | 72 | 72 | 72 |
| Conductivity ($\times 10^{-6}$ Ω · m) | 4.0 | 3.9 | 4.3 | 500 | 4.5 | 510 |
| Connection resistance (mΩ) | 51 | 47 | 43 | 18 | 101 | 104 |

When comparing Examples 11 to 14 including the compound having a cyclic ether group as the component (A) with Comparative Examples 2 and 3, it could be appreciated that the connection resistance value at the interface of the adherend was significantly different depending on the presence or absence of the component (C). On the other hand, regarding the storage stability before curing and the conductivity after curing in the composition, there is no difference between Examples and Comparative Example. From the results of Tables 2 and 4, in Examples 1 to 14, the connection resistance value was reduced regardless of the components (A) and (B), and when the circuit was assembled with the composition, reduction of the circuit resistance could be achieved.

INDUSTRIAL APPLICABILITY

In recent years, nickel or the like is often used for housings of electrical and electronic components. The metal causes an increase in circuit resistance due to a high connection resistance value, but the connection resistance value can be lowered by the present invention. In addition, the storage stability is also maintained, and a discharge amount is not changed during a discharge operation for a long time while simultaneously reducing damage caused by heating to the adherend by curing for a short time. From these properties, the present invention can be used for assembling various electrical and electronic components, and the like, and has a possibility of being developed for a wide range of applications.

The present application is based on Japanese Patent Application No. 2016-173765, filed on Sep. 6, 2016, the entire contents of which is incorporated herein for all purposes by this reference.

The invention claimed is:
1. A thermocurable electroconductive adhesive comprising the following components:
   Component (A): a curable resin,
   Component (B): a thermal curing agent that cures Component (A),
   Component (C): an organometallic complex, and
   Component (D): electroconductive particles,
   wherein the component (D) is included in an amount of 100 to 1000 parts by mass with respect to 100 parts by mass of the component (A) and wherein the thermocurable electroconductive adhesive satisfies the following (i) or (ii):
  (i) the component (A) is a compound having a (meth)acrylic group, the component (B) is an organic peroxide having the following structure, and the thermocurable electroconductive adhesive does not comprise a rubber, an elastomer and a thermoplastic resin:

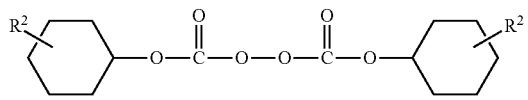

wherein each R² represents an independent hydrocarbon group;
  (ii) the component (A) is a compound having at least one group selected from the group consisting of an epoxy group, an alicyclic epoxy group, and an oxetane group, and the component (B) is an amine compound, wherein the amine compound is an epoxy adduct-type latent curing agent.

2. The thermocurable electroconductive adhesive according to claim 1, wherein when the thermocurable electroconductive adhesive satisfies the above (i), the organic peroxide which is the component (B) is included in an amount of 1 to 10 parts by mass with respect to 100 parts by mass of the total of the component (A).

3. The thermocurable electroconductive adhesive according to claim 1, wherein the component (C) is included in an amount of 0.1 to 10 parts by mass with respect to 100 parts by mass of the component (B).

4. The thermocurable electroconductive adhesive according to claim 1, wherein the thermocurable electroconductive adhesive satisfies the above (ii), the component (B) is included in an amount of 1 to 30 parts by mass with respect to 100 parts by mass of the component (A).

5. The thermocurable electroconductive adhesive according to claim 1, wherein a metal of the component (C) is a divalent metal or a trivalent metal.

6. The thermocurable electroconductive adhesive according to claim 1, wherein the component (C) is an organometallic complex including a ligand having an alkoxy group and/or a carboxylate group.

7. The thermocurable electroconductive adhesive according to claim 1, wherein the metal of the component (C) is at least one kind selected from the group consisting of zinc, aluminum, iron, cobalt, nickel, tin and copper.

8. The thermocurable electroconductive adhesive according to claim 7, wherein the component (C) is at least one selected from the group consisting of zinc acetyl acetonate, aluminumacetyl acetonate, iron phthalocyanine, cobalt acetylacetonate, nickelacetyl acetonate, nickel acetate, dibutyltin dilaurate, and copper oleate.

9. The thermocurable electroconductive adhesive according to claim 1, wherein the component (D) is at least one kind selected from silver powder surface-treated with stearic acid and silver plating powder surface-treated with stearic acid.

10. The thermocurable electroconductive adhesive according to claim 1, wherein a reducing agent is not included.

11. The thermocurable electroconductive adhesive according to claim 1, when the thermocurable electroconductive adhesive satisfies the above (i), the component (A) is a urethane-modified oligomer having a (meth)acrylic group, and 2-hydroxyethyl methacrylate.

12. The thermocurable electroconductive adhesive according to claim 1, when the thermocurable electroconductive adhesive satisfies the above (ii), the component (A) is at least one selected from the group consisting of 3-ethyl-3 phenoxymethyloxetane, 3-ethyl-3{[(3-ethyloxetan-3-yl)methoxy]methyl}oxetane, polyfunctional alicyclic epoxy-containing silicone oligomer, 3',4'-epoxycyclohexylmethyl-3,4-epoxycyclohexanecarboxylate, glycidylamine type epoxy resin, bisphenol F type epoxy resin, p-tert-butylphenyl glycidyl ether, and neodecanoic acid glycidyl ester.

13. The thermocurable electroconductive adhesive according to claim 1, when the thermocurable electroconductive adhesive satisfies the above (ii), the component (B) is a latent curing agent composed of a modified amine compound which is solid at 25° C.

14. The thermocurable electroconductive adhesive according to claim 1, further comprising Component (E) of at least one selected from the group of consisting of 2-hydroxyethyl methacrylate acid phosphate, 2,6-di-tert-butyl-4-methylphenol, ethylenediamine-N,N,N',N'-tetraacetic acid tetrasodium salt tetrahydrate, and epoxy-phenol-boric acid ester blend.

15. The thermocurable electroconductive adhesive according to claim 1, wherein the thermocurable electroconductive adhesive is an electroconductive paste.

16. The thermocurable electroconductive adhesive according to claim 1, wherein the component (D) is included in an amount of 200 to 600 parts by mass with respect to 100 parts by mass of the component (A).

17. The thermocurable electroconductive adhesive according to claim 1, when the thermocurable electroconductive adhesive satisfies the above (i), the component (A) is an urethane-modified oligomer having a (meth)acrylic group, and a monomer having one (meth)acrylic group.

18. The thermocurable electroconductive adhesive according to claim 1, when the thermocurable electroconductive adhesive satisfies the above (ii), the thermocurable electroconductive adhesive does not comprise a rubber, an elastomer and a thermoplastic resin.

19. The thermocurable electroconductive adhesive according to claim 1, wherein the thermocurable electroconductive adhesive is used for an adherend of which an outermost surface is nickel.

20. The thermocurable electroconductive adhesive according to claim 1, further comprising a cation catalyst, wherein the cation catalyst is a salt including tetrakis(pentafluorophenyl) borate as anionic species and quaternary ammonium as cationic species.

21. The thermocurable electroconductive adhesive according to claim 1, when the thermocurable electroconductive adhesive satisfies the above (i), the component (B) is bis(4-t-butylcyclohexyl)peroxydicarbonate.

* * * * *